United States Patent
Webber et al.

[19]

[11] Patent Number: 6,131,427
[45] Date of Patent: *Oct. 17, 2000

[54] FOOT PEG/LOCK HOLDER COMBINATION FOR A MOTORCYCLE

[76] Inventors: James L. Webber; Teri R. Webber, both of P.O. Box 231, Donnelly, Id. 83615

[*] Notice: This patent issued on a continued prosecution application filed under 37 CFR 1.53(d), and is subject to the twenty year patent term provisions of 35 U.S.C. 154(a)(2).

[21] Appl. No.: 08/990,205

[22] Filed: Dec. 13, 1997

[51] Int. Cl.$^7$ ........................................................ B62H 5/00

[52] U.S. Cl. ................................ 70/235; 70/226; 70/233; 280/297; 280/301

[58] Field of Search ........................... 70/233, 234, 235; 280/291, 293, 297, 302, 301

[56] References Cited

U.S. PATENT DOCUMENTS

| | | | |
|---|---|---|---|
| 925,810 | 6/1909 | Hopping | 70/226 |
| 1,055,581 | 3/1913 | Webb | 280/297 X |
| 2,464,683 | 3/1949 | Herbold et al. | 70/235 |
| 2,468,763 | 5/1949 | Landry | 70/235 X |
| 3,760,620 | 9/1973 | Robles | 70/226 |
| 3,763,674 | 10/1973 | Zahner | 70/226 |
| 4,298,211 | 11/1981 | Shitamori | 70/235 X |
| 4,436,232 | 3/1984 | Zane et al. | 224/462 |
| 4,563,016 | 1/1986 | Holleron, Jr. | 280/293 |
| 4,725,075 | 2/1988 | Biancardi | 280/297 X |
| 4,834,405 | 5/1989 | Dimaio | 70/235 X |
| 4,846,491 | 7/1989 | Caceres | 280/293 X |
| 4,869,453 | 9/1989 | Newman | 280/297 |
| 4,878,366 | 11/1989 | Cox | 70/226 X |
| 5,114,167 | 5/1992 | Shieh | 70/235 X |
| 5,127,562 | 7/1992 | Zane | 224/39 |
| 5,133,201 | 7/1992 | LaMott et al. | 70/226 |
| 5,179,848 | 1/1993 | Kief | 70/51 |
| 5,365,758 | 11/1994 | Shieh | 70/226 X |
| 5,388,436 | 2/1995 | Shieh | 70/226 |
| 5,458,308 | 10/1995 | Lin | 248/229 |
| 5,484,153 | 1/1996 | Ricciardi | 280/293 |
| 5,553,471 | 9/1996 | Hanners | 70/235 |
| 5,662,255 | 9/1997 | Lu | 224/451 |
| 5,671,622 | 9/1997 | Yamada et al. | 70/233 |

FOREIGN PATENT DOCUMENTS

| | | | |
|---|---|---|---|
| 77431 | 4/1983 | European Pat. Off. | 70/235 |
| 526748 | 7/1921 | France | 70/235 |
| 1038616 | 9/1953 | France | 70/235 |
| 2449024 | 10/1980 | France | 70/235 |
| 3943266 | 7/1991 | Germany | 70/235 |
| 275671 | 5/1951 | Switzerland | 70/235 |

OTHER PUBLICATIONS

Popular Science, p. 147; 70/235, Jun. 1948.

*Primary Examiner*—Suzanne Dino Barrett
*Attorney, Agent, or Firm*—Workman, Nydegger & Seeley

[57] ABSTRACT

An improved, multi-purpose foot rest peg, having an elongated groove (40) to accommodate a disc rotor brake lock, with a hole (60) to accommodate the cylinder locking apparatur of an existing u-shaped rotor disc lock to be attached to a motorcycle (10), (20), (50) as a foot rest allowing the lock to combine with the foot rest peg clevis to create a FOOT REST/ROTOR DISC LOCK HOLDER COMBINATION FOR A MOTORCYCLE (FIG. 5).

17 Claims, 2 Drawing Sheets

FOOT PEG/LOCK HOLDER COMBINATION FOR A MOTORCYCLE

BACKGROUND OF THE INVENTION

Field of Invention

This invention relates to combining a foot rest peg and a rotor disc lock holder, specifically for carrying a rotor disc lock on a motorcycle, on a foot rest support.

Description of the Related Art

The primary purpose of this invention is to provide motorcyclists with a convenient, safe, easy access way to transport a rotor disc lock to be used on a motorcycle when the motorcycle is in use or is parked. To date this consists of using a pocket, saddlebag, or using ingenuity.

The rotor disc locks are a superior lock, but they are heavy, and there are no lock holders available for this particular style of locks.

Current prior art lock holders are brackets that mount to the frame of the motorcycle, or bicycle and do not accommodate the particular rotor disc lock, but rather the standard u-shaped padlocks.

U.S. Pat. No. 5,662,255, Individual, Taiwan, Sep. 2, 1997 A split tubr mounted to the motorcycle frame.

U.S. Pat. No. 5,671,622, Honda, Japan, Sep. 30, 1997 A lock mounted in the motorcycle frame under the seat.

U.S. Pat. No. 4,869,453, Newman, Calif., Sep. 26, 1989 A bicycle stand/padlock holder device U.S. Pat. No. 4,436,232, KBL Corp., Mass., Mar. 13, 1984. A lock holder mounted to a motorcycle frame support.

U.S. Pat. No. 5,127,562, Zane, Mass., May 22, 1990. This is a universal mounting bracket for a bicycle u-shaped padlock.

U.S. Pat. No. 5,179,848, Kief, La., Jun. 8, 1992. This is a holder for a tumbler lock.

U.S. Pat. No. 5,458,308, Taiwan, Dec. 27, 1993. Again, this is a bicycle u-shaped padlock holder.

None of the existing patents are appropriate to conveniently carry a rotor disc brake lock for a motorcycle.

After searching motorcycle parts magazines, such as: Dennis Kirk, Inc.—Parts and Accessories for Harley-Davidson Motorcycles 1997, 955 So. Field Ave., Rush City, Minn. 55069

Thunder Press —Western Edition—Sixth year, Eighth Issue, Nov. 1997 JP Cycles—Parts and Accessories for your Harley-Davidson 1997 P.O. Box 138, Amamosa, Iowa 52205

Chrome Specialties Inc., 1997 Vol. XI, 4209 Diplomacy Rd., Ft. Worth Tex. 76155 No available lock holder for the rotor disc brake lock was found. Next ensued a search of motorcycle parts stores. Russells's Customs, 517 Sherman Ave., Coeur D'Alene, Id. 83814 Latus Motors Harley-Davidson, Inc., 7001 East Trent, Spokane, Wa. 99212 Evolution, 307 E. Sprague Ave., Spokane, Wa. 99202 Harley-Davidson of Salt Lake City, 2928 S. State St., Salt Lake City Ut. 84115

American Ledgend Motorcycles, 3528 West 3500 South, West Valley City, Ut. 84119

Again, No acceptable rotor disc brake lock holder was found. The rotor disc brake locks are already in production and on the market.

BRIEF SUMMARY OF THE INVENTION

Accordingly, the object and advantages of my invention are:

a. to provide a holder for the rotor disc brake lock, already on the market;

b. to provide a convenient and dual purpose carrier and foot rest peg for motorcycles;

c. by using existing foot rest peg placement holes already on most motorcycles, no motorcycle modifications are necessary;

d. allowing the rotor disc lock to stay with the motorcycle at all times, either parked or in transit.

e. providing a safe, attractive, and secure foot rest for the motorcycle passenger;

f. lock is locked onto the foot rest peg when not employing the lock to anti-theft the motorcycle;

g. lock holding foot rest peg is very attractive and does not detract from the appearance from the motorcycle;

h. anti-vibration device on the foot rest eliminates noise and vibrations and excessive wear In accordance with the present invention, combining a foot rest for the rider of the motorcycle and simultaneously providing a carrier/holder for a specific rotor disc lock.

DETAILED DESCRIPTION OF PREFERRED EMBODIMENTS

Figure 5:
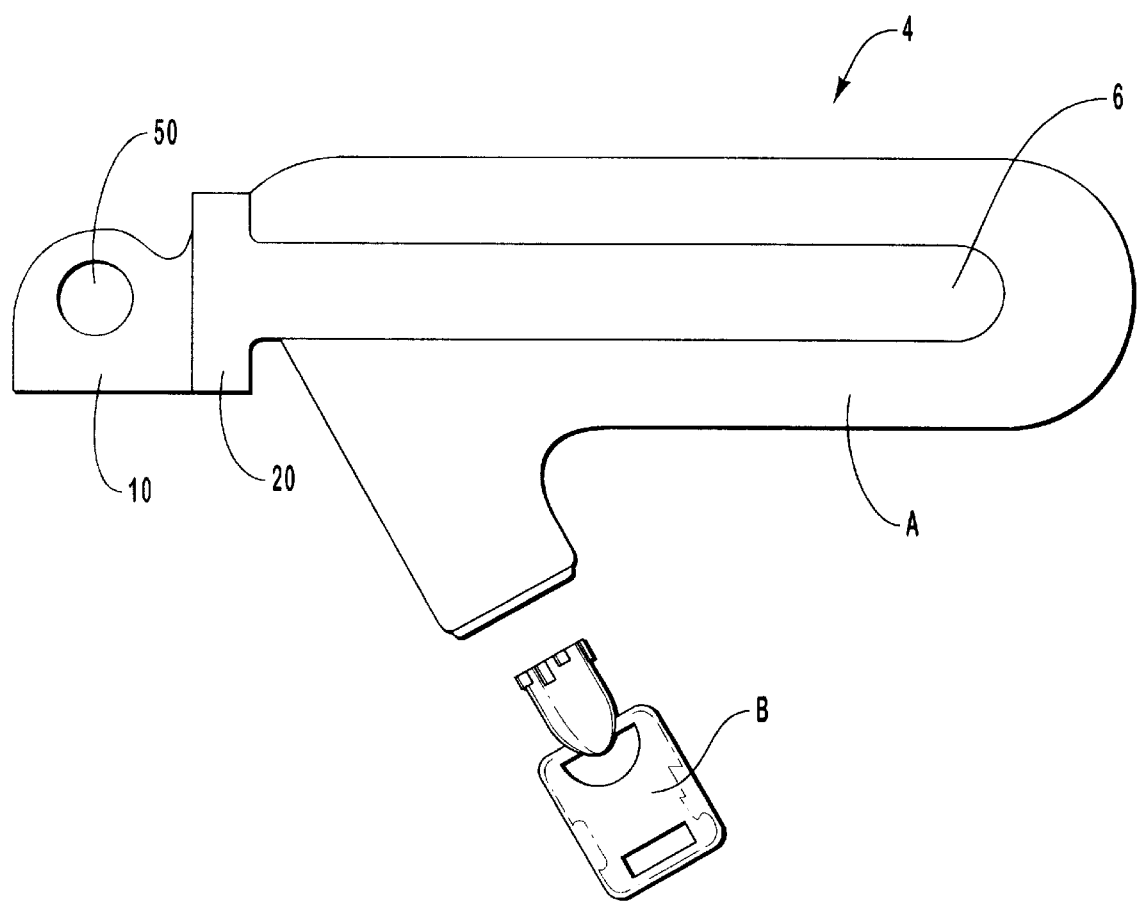
FIG. 5 shows the side view of the foot peg and attached rotor disc lock.

A typical embodiment of the foot-peg/lock holder 4 is illustrated in FIG. 5, which is mounted directly to existing foot-peg mounting portion on a motorcycle. As known in the art, a foot peg is typically configured to swing up when not in use by a passenger, and down when needed as a foot rest. As shown in the accompanying figures, the foot-peg/lock holder 4 includes an elongated member 6 which is adapted to receive a U-shaped disk lock A and an attachment portion 10 that is adapted to attach the elongated member to the motorcycle. The attachment portion 10 preferably includes a mounting hole 50 that has an inside diameter of about ⅜ of an inch. Additionally, a shoulder lock stoop 20 is preferably positioned between the elongated member 6 and the attachment portion 10.

Figure 1:
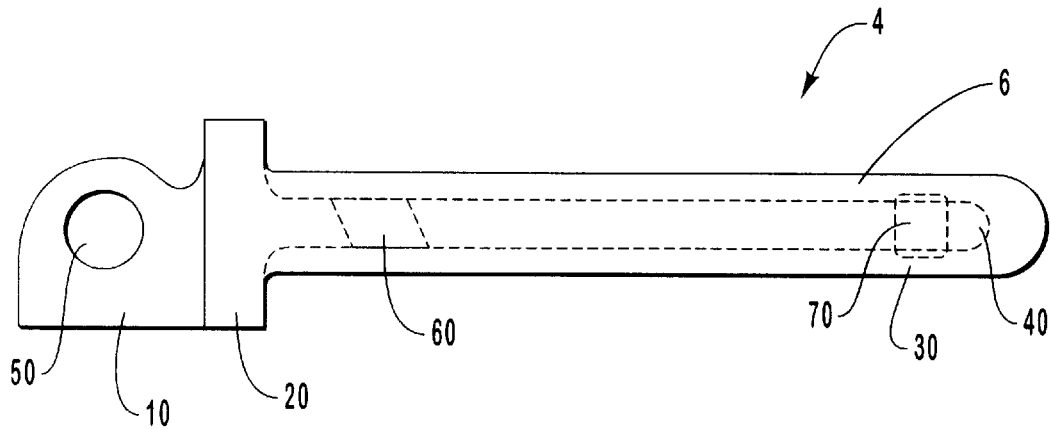
FIG. 1 shows the side view of the foot rest peg with lock hole and clevis mounting hole.
Figure 2:
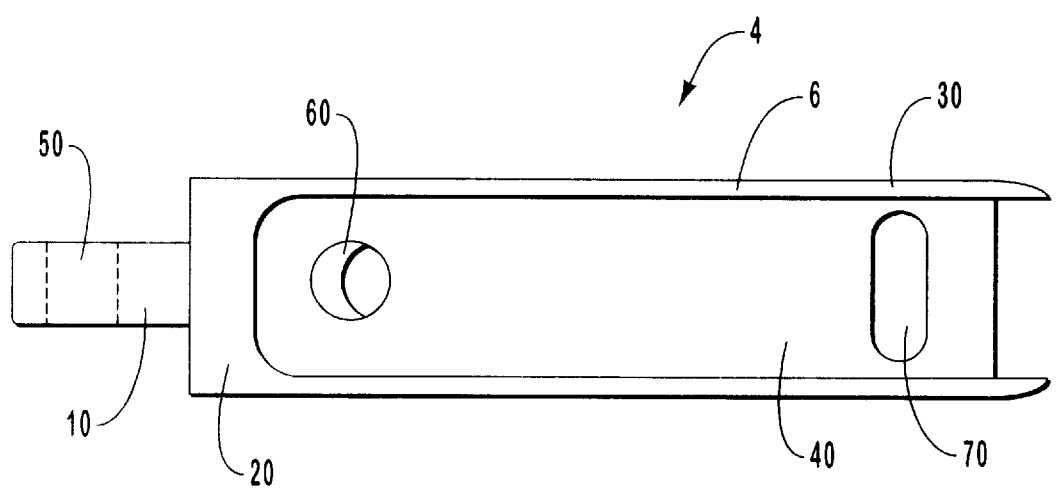
FIG. 2 shows the top view of the foot rest peg with lock hole and clevis mounting hole.

In greater detail, FIGS. 1–4 show the side view of the foot peg/lock holder 4 without the U-shaped disk lock A attached. As shown in the accompany figures, the elongated member 6 includes lock mounting guides 30 and a lock load surface 40. As best seen in FIG. 2, the lock load surface 40 is a generally flat surface of the elongated member 6 that accommodates the lock A. The lock mounting guides 30 are used to guide the lock A into the desired position, but the lock mounting guides are not required. The elongated member 6 also includes a lock mounting hole 60 that is adapted to receive a lock cylinder of the U-shaped disk lock A. This allows the U-shaped disk lock A to be releasably attached to the elongated member 6. As seen in FIGS. 1 and 2, the hole 60 is preferably located at an angle relative to the outer surface of the lock load surface 40. The hole 60 preferably has an inside diameter of about ⅜ of an inch, but it could be larger or smaller depending, for example, upon the lock cylinder of the U-shaped disk lock A.

Figure 3:
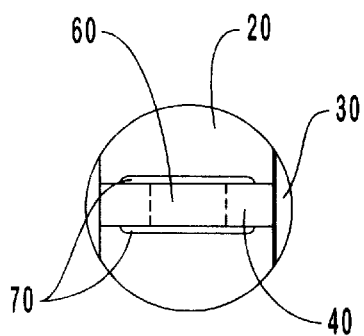
FIG. 3 shows the end of the foot rest peg.
Figure 4:
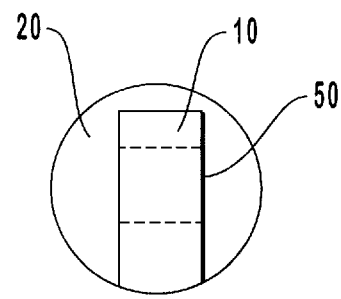
FIG. 4 shows the clevis end of the foot rest peg.

As seen in FIGS. 1–3, the foot-peg/lock holder 4 also includes an anti-vibration device 70 attached near an end of the elongated member 6. The anti-vibration device 70 preferably comprises a rubber grommet or insert that extends slightly above the upper and lower surfaces of elongated members.

In operation, the foot-peg/lock holder 4 is slid onto the elongated member 6 and then the lock A is locked in place. Thus, the motorcycle can be used while the lock A is in this storage position. When the lock A is needed to lock the motorcycle, the lock is simply unlocked with a key B, slid off the elongated member 6 and slipped onto the rotor disc of the motorcycle. Thus, the manner of using the foot-peg/lock holder 4 is as follows: slide the open lock A onto the elongated member 6 and depress the cylinder to lock it in place. In order to remove the lock A, simply unlock the lock and slide it off the elongated member 6 foot-peg/holder 4.

What is claimed is:

1. A foot rest peg for a motorcycle that is adapted to releasably receive a rotor disc brake lock, the foot rest peg comprising:

an elongated member including a first outer surface, a second outer surface, a first end, and a second end, an aperture that extends through said elongated member, said aperture being adapted to receive a lock cylinder of a rotor disc brake lock such that the rotor disc brake lock can be releasably attached to said elongated member; and an attachment portion connected to the first end of said elongated member, said attachment portion being adapted to attach said elongated member to a motorcycle;

wherein the rotor disc brake lock is attachable to said elongated member in order to store the rotor disc brake lock.

2. The foot rest peg as claimed in claim 1, further comprising a non-skid material attached to said elongated member to provide a non-slip surface for a foot of a motorcycle rider.

3. The foot rest peg as claimed in claim 1, wherein said attachment portion of said elongated member is adapted to be pivotally attached to a foot rest peg mounting portion of a motorcycle.

4. The foot rest peg as claimed in claim 1, wherein said elongated member has a thickness that is slightly less than a corresponding height of an elongated opening in the rotor disc brake lock such that the elongated member is adapted to be closely received within the elongated opening in the rotor disc brake lock.

5. The foot rest peg as claimed in claim 1, wherein said aperture is located proximate the first end of said elongated member.

6. The foot rest peg as claimed in claim 1 further comprising an elongated slot in said elongated member that is adapted to receive the rotor disc brake lock.

7. The foot rest peg as claimed in claim 1, wherein said aperture is angled relative to the first outer surface and the second outer surface such that it is adapted to receive the lock cylinder of the rotor disc brake lock.

8. The foot rest peg as claimed in claim 1, wherein said anti-vibration device includes a grommet.

9. The foot rest peg as claimed in claim 8, wherein said anti-vibration device includes a grommet.

10. The foot rest peg as claimed in claim 1, wherein said attachment portion of said elongated member is adapted to be attached to an existing foot peg mounting portion on a motorcycle.

11. The foot rest peg as claimed in claim 1, further comprising a generally flat upper surface on said elongated member, said generally flat upper surface being adapted to engage a foot of a rider of the motorcycle.

12. The foot rest peg as claimed in claim 11, further comprising an anti-slip surface on said generally flat upper surface.

13. A holder for a U-shaped rotor disc lock for a motorcycle, comprising:

an elongated member with a generally planar first outer surface and a generally planar second outer surface, an aperture extending said first outer surface and at least a portion of said elongated member, said aperture being adapted to receive a lock cylinder of the U-shaped rotor disc lock; and an attachment portion that is adapted to attach said elongated member to a motorcycle, wherein the U-shaped rotor disc lock is attachable to said elongated member in a first position; and wherein the holder is adapted to be used as a foot peg for a rider of the motorcycle in said first position.

14. The holder as claimed in claim 13, wherein the U-shaped disc lock is stored in the first position while the motorcycle is in use.

15. The holder as claimed in claim 13, wherein the first outer surface and the second outer surface of the elongated member are generally parallel.

16. The holder as claimed in claim 13, wherein the first outer surface and the second outer surface of the elongated member are separated by a distance slightly less than a height of an elongated opening in the U-shaped rotor disc lock.

17. The holder as claimed in claim 13, further comprising a mounting hole in said attachment portion which is adapted to pivotally attach said elongated member to a motorcycle.

* * * * *

UNITED STATES PATENT AND TRADEMARK OFFICE
CERTIFICATE OF CORRECTION

PATENT NO.     : 6,131,427
DATED          : October 17, 2000
INVENTOR(S)    : James L. Webber; Teri R. Webber It is certified that error appears in the above-identified patent and that said Letters Patent is hereby corrected as shown below:

Column 1,
Line 51, before "No available lock" start a new paragraph

Column 2,
Line 16, after "the appearance" change "from" to -- of --
Line 52, after "As shown in the" change "accompany" to -- accompanying --

Column 4,
Line 8, after "in claim 1," change "wherein said" to -- further comprising an --
Line 9, after "anti-vibration device" change "includes a grommet" to -- attached to said elongated member --

Signed and Sealed this

Fourth Day of December, 2001

*Attest:*

NICHOLAS P. GODICI
*Attesting Officer*     *Acting Director of the United States Patent and Trademark Office*